United States Patent [19]

Williamson et al.

[11] Patent Number: 5,114,327

[45] Date of Patent: May 19, 1992

[54] RAPID COOLING APPARATUS FOR AN INJECTION MOLDING MACHINE

[76] Inventors: James T. Williamson, 225 Brydon Rd., Kettering, Ohio 45419; Michael A. Carter, 723 12th St., Miamisburg, Ohio 45342

[21] Appl. No.: 646,071

[22] Filed: Jan. 25, 1991

[51] Int. Cl.$^5$ .............................................. B29C 45/80
[52] U.S. Cl. ...................................... 425/139; 264/37;
425/526; 425/547; 425/549; 425/556
[58] Field of Search ............... 425/139, 526, 547, 548, 425/549, 554, 556; 264/37

[56] References Cited

U.S. PATENT DOCUMENTS

| | | | |
|---|---|---|---|
| 4,136,146 | 1/1979 | Ninneman | 425/548 |
| 4,209,290 | 6/1980 | Rees et al. | 425/547 |
| 4,261,949 | 4/1981 | Spurr et al. | 264/535 |
| 4,313,905 | 2/1982 | Hafele | 425/534 |
| 4,472,131 | 9/1984 | Ryder | 425/548 |
| 4,583,891 | 5/1986 | Ichizawa et al. | 425/526 |
| 4,592,719 | 6/1986 | Bellehache et al. | 425/526 |
| 4,690,633 | 9/1987 | Schad et al. | 425/526 |
| 4,721,452 | 1/1988 | Delfer, III | 425/547 |

FOREIGN PATENT DOCUMENTS 2825866 12/1978 Fed. Rep. of Germany ...... 425/526

*Primary Examiner*—Tim Heitbrink
*Attorney, Agent, or Firm*—Locke Reynolds

[57] ABSTRACT

Rapid cooling of molded workpieces formed in an injection molding machine such as PET parisons is provided by a receiver receiving molded workpieces upon ejection from the molding machine, the receiver being transported out of the molding machine to an adjacent position where a cooling head coupled to a source of cooling fluid such as liquid $CO_2$ directs the fluid toward the surfaces of each workpiece. The cooling head engages and is sealed to the receiver to inhibit the escape of cooling fluid into the atmosphere thereby reducing cost, environmental impact, etc. A sensor coupled to a control of the cooling fluid source permits the release of cooling fluid from said source to contact the workpieces only when the cooling head is engaged with and sealed to the receiver. A vacuum unit withdraws cooling fluid from the receiver subsequent to contact between the workpieces and the cooling fluid. The cooling fluid is then recooled and recycled for reuse.

12 Claims, 3 Drawing Sheets

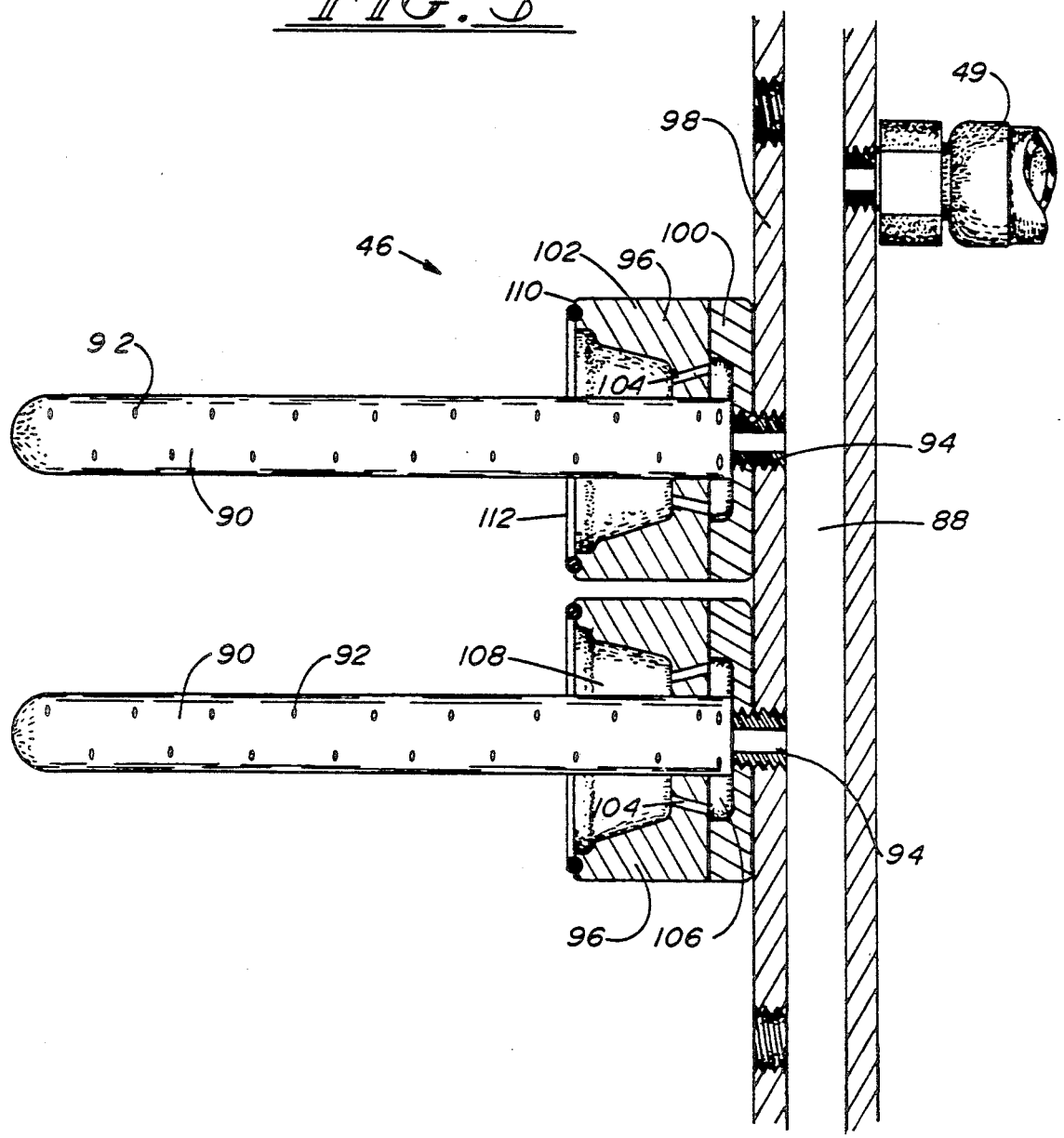

RAPID COOLING APPARATUS FOR AN INJECTION MOLDING MACHINE

BACKGROUND OF THE INVENTION

This invention relates generally to apparatus for use in conjunction with injection molding machines for rapidly cooling work pieces molded by the molding machine. The invention relates particularly to a method and apparatus for rapidly cooling injection molding parisons to be employed in the manufacture of biaxially oriented articles such as containers for carbonated beverages and the like.

The manufacture of biaxially oriented containers such as those formed polyethylene terephthalate (PET), employs an initial step of forming a parison or preform by an injection molding Process. The parisons are generally in the shape of a hollow cylinder closed at one end and are often formed in multicavity molds into which plastic material is injected around a core positioned within each cavity. Generally the core and cavity are cooled by means of a liquid flowing through channels within the walls of the core and cavity thereby cooling the plastic forming the parison to a form-stable shape defined by the core and cavity.

Once the parison is formed and cooling is initiated, the core and parison are removed from the cavity thereby exposing the outer surface of the parison to room temperature air. An ejector or stripper mechanism then strips the parisons from the cores to expose the inside surface of the parisons to room temperature air and to free the molding machine to initiate another molding cycle. As the parisons are stripped from the cores, any contribution by the cores to the form stability of the parisons is also removed thereby freeing the parisons to be modified from their initially molded shape by outside forces.

In order to reduce this post molding modification of parison shape, it is desirable that the preform be cooled as much as possible thereby enhancing its form stability. The cooling can be enhanced by merely retaining the molded article in contact with the cooled cavity and core for an extended period of time thereby allowing additional heat to be extracted from the parison. This has the undesirable affect of extending the time for each injection molding cycle thereby reducing the number of parisons which can be produced in a given unit of time.

In order to enhance the cooling of the parisons, it has been suggested to provide additional cooling apparatus. In one such apparatus disclosed in U.S. Pat. No. 4,472,131, the parison, while retained on the core rod of the mold, is positioned within a supercooling mold. The outer surface of the parison cools either by direct contact with the wall of the supercooling mold or by cold air passing through an air gap between the outer surface of the parison and the supercooling mold. The cold compressed air is introduced at a point corresponding to the tip or sprue end of the preform. After passing along the length of the outer wall of the preform, the air escapes through holes located in the mold adjacent to the preform neck ring or thread finish. During the cooling, the parison is retained on the core rod of the initial mold in which the parison was formed. Thus in order that the molding cycle of the molding machine may continue, duplicate core rods and shifting mechanisms for those core rods must be supplied to permit a reasonable production of parisons in a given unit of time.

In another disclosure of cooling apparatus found in U.S. Pat. No. 4,592,719, the parison is removed from the core rod on which it was formed by a pneumatic grip which draws atmospheric air by suction along the length of the parison between the parison outer wall and the pneumatic grip. The grip then removes the parison from the molding machine where a second grip is introduced into the interior of the parison. The second grip also causes atmospheric air to be sucked along the inner walls of the parison thereby enhancing the cooling of the parison through turbulent contact with a large volume of ambient air.

While such apparatus speeds the cooling of the parisons to an acceptable form stable temperature in a shorter time than would be experienced by mere contact with ambient air in the absence of such apparatus, further reductions in cooling time are desirable which would allow even additional increases in parison production from a given molding machine. Thus an object of the present invention is to develop a method and apparatus for reducing the time period of the cooling of the preform subsequent to injection molding thereby enhancing the productivity of the associated injection molding machine.

SUMMARY OF THE INVENTION

In accordance with the present invention, an apparatus is provided for use with an injection molding machine which includes a receiver means for receiving molded work pieces upon ejection of the work pieces from the molding machine. A transporter means is coupled to the receiver means for transporting the receiver means relative to the molding machine from a first position within the injection molding machine to a second position adjacent to the injection molding machine. A source of cooling fluid is provided together with a directing means for directing the cooling fluid toward the surfaces of each work piece in the receiver means. A moving means coupled to the directing means moves the directing means relative to the receiver means from a disengaged position to an engaged position where the directing means and receiver means are engaged with each other. Sealing means is provided for sealing the directing means to the receiver means to restrict any escape of cooling fluid while the directing means and receiver means are engaged with each other. Control means coupled to the source of cooling fluid and responsive to the relative position of the receiver means and directing means releases cooling fluid from the source only when the directing means and receiving means are engaged and are sealed by the sealing means. A vacuum means is coupled to the receiver means for withdrawing cooling fluid from the receiver means subsequent to contact between the work pieces and the cooling fluid.

One feature of the present invention is the application of a continuous flow of cooling flow to both the internal and the external surfaces of a work piece while it is completely enclosed. This feature provides the advantage of confining the cooling fluid so as to contact the work piece repeatedly thereby insuring the extraction of a maximum amount of heat from the work piece with the minimum amount of cooled fluid to achieve a high efficiency heat extraction.

An important feature of the present invention is the employment of a seal means between the receiver means and the directing means which prevents the escape of cooling fluid during the cooling process thereby permitting a recycling of the cooling fluid through a vacuum system. This feature has the advantage of permitting the use of fluids which due to cost, environmental impact, or other factors, might otherwise not be feasible. The preferred cooling fluid to be employed in the present invention is that of liquified carbonic (liquid $CO_2$).

While the invention is hereafter described in connection with the particular application of the methods and apparatus herein disclosed to the molding of PET parisons for subsequent manufacture into biaxially oriented containers for carbonated beverages and the like, it will be appreciated that the rapid cooling system in accordance with the present invention could be employed for work pieces of a character other than parisons. Additional features and advantages of the invention will become apparent to those skilled in the art upon consideration of the following detailed description of a preferred embodiment exemplifying the best mode of carrying out the invention as presently perceived. The detailed description particularly refers to the accompanying drawings.

BRIEF DESCRIPTION OF THE DRAWINGS

FIG. 3 is a sectional detail view of a directing means in accordance with the present invention.

DESCRIPTION OF THE PREFERRED EMBODIMENT

Figure 1:
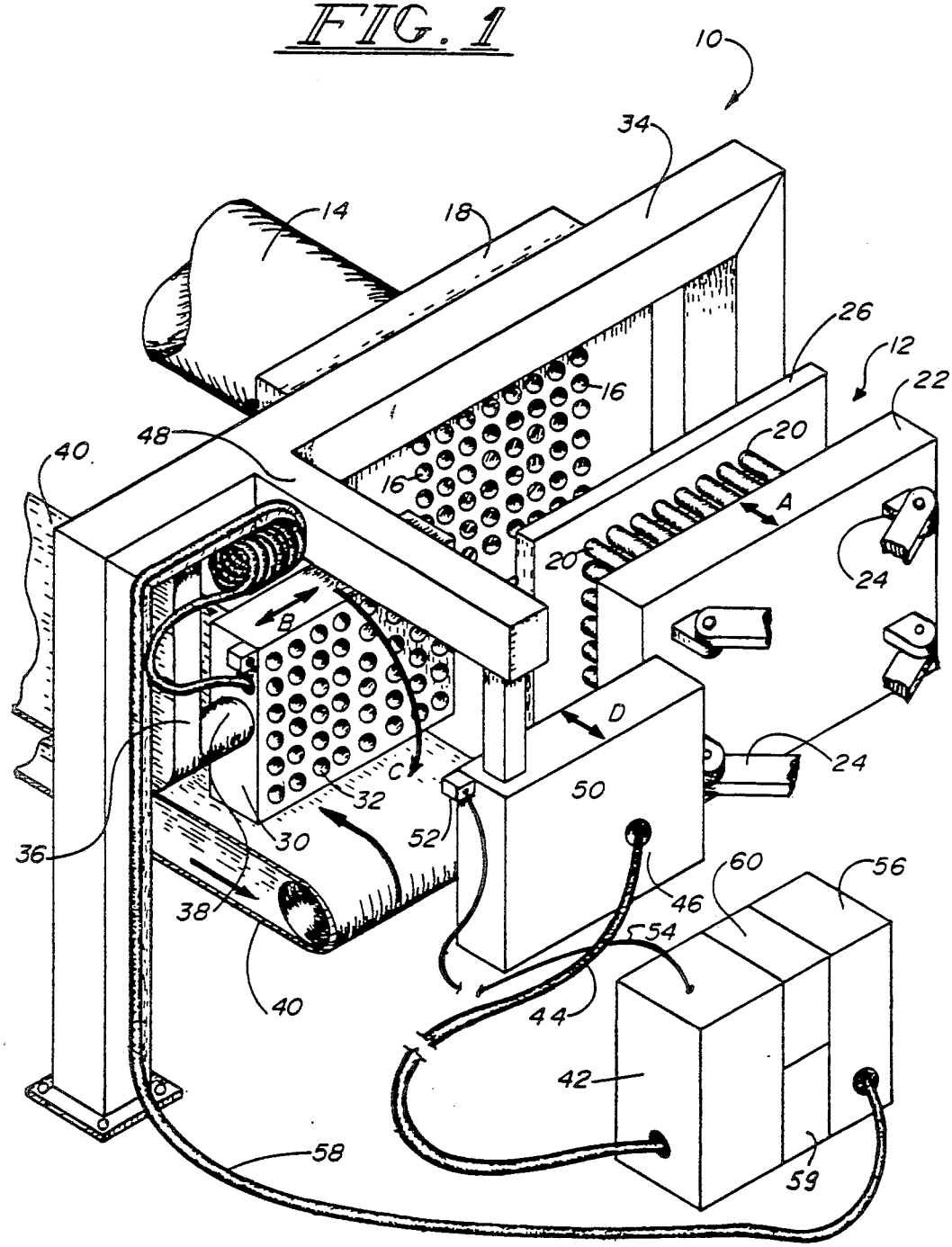
FIG. 1 is a perspective view of an apparatus in accordance with the present invention.

An apparatus 10 for use with an injection molding machine 12 is shown in FIG. 1. The injection molding machine 12 is illustrated only in part to provide an illustrative environment for the apparatus 10. The injection molding machine 12 includes an injection unit 14 which acts to supply plastic in a molten form to a plurality of cavities 16 in cavity unit 18. Each cavity 16 in the cavity unit 18 has a corresponding core 20 fixed to core unit 22 which moves relative to the cavity unit 18 by means of a power actuated toggle system 24 or similar apparatus as is conventional in the industry. The core unit reciprocates in the direction "A" so that the cavity 16 and cores 20 cooperate to define an essentially closed chamber in which a work piece such as a parison can be formed. Subsequent to the formation of the parison between core and cavity, the cavity unit moves to the position illustrated in FIG. 1 and the molded parisons are stripped from the cores 20 by a stripper plate 26 as is conventional in the industry.

The apparatus 10 in accordance with the present invention includes a receiver means in the form of a receiver frame 30. The receiver frame 30 includes a plurality of chamber elements 32 in a pattern which will permit the chamber elements to receive the molded parisons as they are stripped from the cores 20 of the injection molding machine 12 by stripper mechanism 26. The receiver frame 30 is suspended from an overhead track 34 serving to define a pathway along which the receiver travels in the direction "B". A transport mechanism of conventional design including vertical hanger 36 transports the receiver frame 30 from a first position within the injection molding machine 12 so that the chamber elements 32 are aligned with the cores 20 to a second position adjacent to the injection molding machine 12 as shown in FIG. 1.

The receiver frame 30 is coupled to the vertical hanger 36 by a discharge unit 38 which is adapted to pivot the receiver frame 30 about a horizontal axis in the direction of arc "C" so as to unload the contents of the chamber elements 32 onto conveyer belt 40 or other similar conveying means for conveying the parisons from the position of the molding machine 12 to a subsequent processing operation. Once the parisons have been removed from the molding machine and prior to their being discharged by discharge unit 38, they are subjected to a cooling fluid such as liquid carbonic taken from source 42.

The source of cooling fluid 42 is connected by flexible conduit 44 to a cooling head 46. The cooling head 46 is suspended from track 48 which is perpendicular to track 34 and defines a pathway for movement of the cooling head 46 with respect to the receiver frame 30 when the receiver frame is in the position illustrated in FIG. 1. A moving means of conventional design including vertical support 50 causes the cooling head to move in the direction "D" between a disengaged position as shown in FIG. 1 and an engaged position where the cooling head 46 and receiver frame 30 are engaged with each other. A sealing means, not illustrated in FIG. 1, seals the cooling head to the receiver frame so as to inhibit any escape of cooling fluid while the cooling head and receiver frame are engaged with each other.

A control means 52 which can be in the form of a microswitch or other similar sensor is coupled to the source of cooling fluid 44 by an appropriate cable 54. The control unit 52 is responsive to the relative position of the cooling head 46 and receiver frame 30 so as to cause release of cooling fluid from source 42 only when the cooling head 46 is sealed to the receiver frame.

A vacuum unit 56 is coupled to the receiver frame 30 by means of an appropriate flexible conduit 58 for withdrawing the cooling fluid from the receiver frame 30 subsequent to contact between the cooling fluid and the parisons held within the chamber elements 32. A recycling unit 60 which can include a fluid chiller and pump of conventional design recools the cooling fluid received by the vacuum unit 56 and recycles the cooled and filtered fluid to the source 42 for subsequent use.

Figure 2:
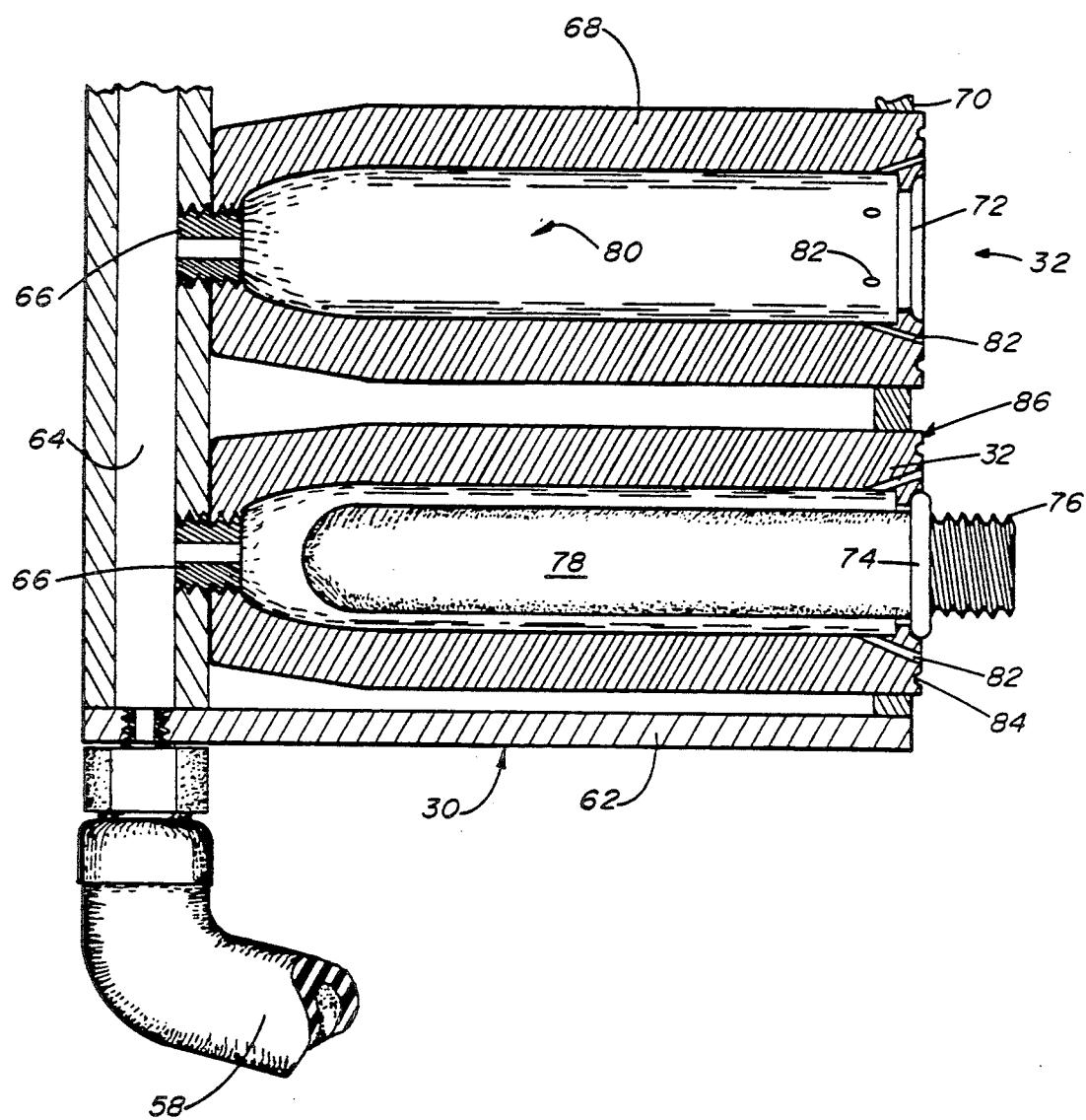
FIG. 2 is a sectional detail view of a receiving means in accordance with the present invention.

As shown in FIG. 2, the receiver frame 30 is defined by a plurality of perimeter plates 62 which cooperate to define the overall geometry of the receiver unit 30. A vacuum plenum 64 is provided at the rear of the receiver unit and is coupled to the flexible conduit 58 discussed previously. The chamber elements 32 are each coupled by a threaded element 66 to the vacuum plenum. Each of the chamber elements is seen to constitute a generally cylindrical wall member 68 extending forward from the threaded element 66 through an opening in front wall 70.

Each chamber element 32 includes an inwardly directed lip 72 at the mouth of the cylindrical wall 68 adapted to engage the lower surface of a radially extending flange 74 on parison 76 so as to suspend the parison within the chamber element 32 such that a small space is provided between the outer wall 78 of parison 76 and the inner surface 80 of wall member 68. A plurality of openings 82 on the front face 86 of the chamber elements 32 provide a pathway for cooling fluid to enter the space between the parison outer wall 78 and the chamber element inner wall 80. A sealing groove 84 surrounds the plurality of openings 82 on the front face 86 of the chamber elements 32.

A cooling head 46, shown in greater detail in FIG. 3, is coupled to conduit 44 which supplies cooling fluid from source 42 shown in FIG. 1 to a pressure plenum 88. The cooling head 46 includes a plurality of stem elements 90 which are adapted to project into the interior of the parison 76 and include a plurality of small apertures 92 through which cooling fluid passes to cool the interior surface of the parison. The cooling fluid passes from the pressure plenum 88 into the stem elements 90 through hollow threaded element 94 which element also secures the two piece cap unit 96 to the forward Plate 98 of the pressure plenum 88. The two element cap unit 96 comprises a base member 100 and a finish enclosing member 102 which are sealed or bonded together to form a single unit. A plurality of apertures 104 lead from a top chamber 106 into the finish receiving chamber 108. The lip 110 of the finish enclosing member 102 includes a sealing means such as O-ring 112 to seal the finishing closing member to the front face of the corresponding chamber element 32.

In use, a set of molded parisons 76 or other similar work pieces formed in an injection molding machine 10 are received by a receiver 30 upon being stripped from cores 20 by a stripper mechanism 26. The receiver 30 is transported from a position within the molding machine 20 to a second position adjacent to the molding machine by a transporter mechanism following a pathway 34. A cooling head 46 moves along a path 48 perpendicular to pathway 34 to engage and be sealed to the receiver frame 30 such that stem elements 90 project down into the interior of the parison 76 which are retained within the hollow cylindrical walls 68 of the chamber elements 32. Sensor 52 then activates the release of a cooling fluid such as liquid carbonic from source 42 through conduit 44 into pressure plenum 88.

The fluid then is distributed through openings 92 in stem 90 and 104 in finishing closing member 102 to the interior and top of the parison 76. The cooling fluid, prevented from escaping into the atmosphere by seal means 112, travels through openings 82 through the space between the outer wall 78 of the parison 76 and the inner wall 80 of the chamber elements 32 to further cool the exterior of the parison 76. Subsequent to contact with the walls of the parison 76, the cooling fluid is drawn into vacuum plenum 64 through hollow threaded member 62 by vacuum unit 62. The cooling fluid is then recycled through the filtering unit 59 and chilling unit 60 back to the source of cooling fluid 42.

Following the cooling of the parisons, the cooling head 46 retracts to the position shown in FIG. 1 and the receiver means is pivoted by discharge unit 38 in the direction of arrow "C" to discharge the cooled parisons onto moving conveyer belt 40 or other similar product handling device. During the cooling process, the injection molding machine 10 has executed another molding cycle. Upon return of the receiver frame to the vertical position shown in FIG. 1, receiver frame is carried into the space between the cavity unit 18 and stripper frame 26 to receive another set of parisons.

Although the invention has been described in detail with reference to the illustrated preferred embodiment, variations and modifications exist within the scope and spirit of the invention as described and is defined in the following claims.

What is claimed is:

1. Apparatus for use with an injection molding machine, the injection molding machine having a core unit and a cavity unit for rapidly cooling a set of molded workpieces, the apparatus comprising:

receiver means for receiving said molded workpieces upon ejection from said molding machine;

transporter means coupled to the receiver means for transporting the receiver means relative to said molding machine between a first position within said injection molding machine and a second position adjacent to said injection molding machine;

a source of cooling fluid and directing means for directing the cooling fluid toward a surface of each workpiece in the receiver means;

moving means coupled to the directing means for moving the directing means relative to the receiver means between an engaged position where the directing means and receiver means are engaged with each other and a disengaged position where the directing means and receiver means are spaced from each other by a minimum selected distance;

sealing means for sealing the directing means to the receiver means to restrict any escape of cooling fluid while the directing means and receiver means are engaged with each other;

control means coupled to the source of cooling fluid and responsive to the relative position of the receiver means and the directing means for releasing cooling fluid from said source only when the directing means is engaged with the receiver means at the engaged position; and vacuum means coupled to the receiver means for withdrawing cooling fluid from the receiver means subsequent to contact between the workpieces and the cooling fluid.

2. The apparatus of claim 1 further comprising recycling means coupled to the vacuum means for recycling the cooling fluid for subsequent use.

3. The apparatus of claim 2 wherein the recycling means comprises compress means for compressing the fluid, and filtering means for filtering the fluid prior to said subsequent use.

4. The apparatus of claim 1 wherein the receiver means comprises a frame and a plurality of chamber elements fixed to the frame, each chamber element having an inside surface configured to generally mirror an outside surface of one of said workpieces, and means for retaining the workpiece in spaced-apart relation from the chamber element inside surface.

5. The apparatus of claim 1 wherein the transporter means comprises pathway defining means fixed relative to said molding machine for defining a pathway along which the receiver means is transported, and carrier means for carrying the receiver means along the pathway defined by the pathway defining means.

6. The apparatus of claim 1 wherein the directing means comprises a cooling head and a plurality of stem elements fixed to the cooling head, each stem element having an outside surface configured to generally mirror an inside surface of one of said workpieces, and means for sealing the directing means to the receiver means to restrict any escape of cooling fluid.

7. The apparatus of claim 1 wherein the moving means comprises track defining means coupled to the transporter means for defining a track along which the directing means is moved, and motive means for moving the directing means along the track defined by the track defining means.

8. The apparatus of claim 1 wherein the control means comprises sensing means for sensing the relative position of the receiver means and the directing means, and valve means coupled to the source of cooling fluid and the sensing means for permitting flow of the cooling fluid through the directing means toward said workpieces only when the receiver means and the directing means are contiguous to each other.

9. The apparatus of claim 1 wherein the vacuum means comprises a cooling means and pumping means connected to the cooling means and the receiving means for pumping cooling fluid from the receiver means through the cooling means for re-cooling the cooling fluid to a preselected temperature.

10. The apparatus of claim 1 further comprising discharge means coupled to the receiver means for discharging the workpieces from the receiver means subsequent to cooling of the workpieces by the cooling fluid.

11. The apparatus of claim 10 wherein the discharge means comprises rotation means coupled to the receiver means and to the transporter means for rotating the receiver means through an angle sufficient to cause said workpieces to be dumped from the receiver means.

12. Apparatus for use with an injection molding machine, the injection molding machine having a core unit and a cavity unit for rapidly cooling a set of molded parisons, each parison including a support ring, the apparatus comprising:
 a receiver frame and a plurality of chamber elements fixed to the frame for receiving said molded parisons upon ejection from said molding machine, each chamber element having an inside surface configured to generally mirror an outside surface of one of said parisons and a shoulder for engaging said parison support ring to retain the parison in spaced-apart relation from the chamber element inside surface;
 a transporter coupled to the receiver frame for transporting the receiver frame relative to said molding machine between a first position within said injection molding machine and a second position adjacent to said injection molding machine;
 a cooling head, a source of cooling fluid coupled to the cooling head, and a plurality of stem elements fixed to the cooling head, each stem element having an outside surface configured to generally mirror an inside surface of one of said parisons including an aperature for directing cooling fluid toward the parison inside surface, and a seal surrounding the stems for sealing the cooling head to the receiver frame to restrict any escape of cooling fluid;
 a moving mechanism coupled to the cooling head for moving the cooling head relative to the receiver frame between an engaged position where the cooling head and receiver frame are engaged with each other and a disengaged position where the cooling head and receiver frame are spaced from each other by a minimum selected distance, and a discharge element coupled to the receiver frame for discharging the parisons from the receiver frame subsequent to cooling of the parisons by the cooling fluid;
 a sensor for sensing the relative position of the receiver frame and the cooling head, and a valve coupled to the source of cooling fluid and the sensor for permitting flow of the cooling fluid through the cooling head toward said parisons only when the receiver frame and the cooling head are contiguous to each other; and
 a fluid chiller and a pump connected to the fluid chiller and the receiver frame for pumping cooling fluid from the receiver frame through the fluid chiller for re-cooling the cooling fluid to a preselected temperature subsequent to contact between the parisons and the cooling fluid, the pump being connected to the source of cooling fluid for recycling the cooling fluid for subsequent use.

* * * * *